United States Patent
Moy et al.

(10) Patent No.: US 9,384,113 B1
(45) Date of Patent: Jul. 5, 2016

(54) SYSTEMS AND METHODS FOR IDENTIFYING PORT PROTOCOLS USING LEDS

(71) Applicant: QLOGIC, Corporation, Aliso Viejo, CA (US)

(72) Inventors: Wilson Moy, Plymouth, MN (US); Martin W. Holmes, Waconia, MN (US)

(73) Assignee: QLOGIC, Corporation, Aliso Viejo, CA (US)

(*) Notice: Subject to any disclaimer, the term of this patent is extended or adjusted under 35 U.S.C. 154(b) by 499 days.

(21) Appl. No.: 13/762,715

(22) Filed: Feb. 8, 2013

Related U.S. Application Data (60) Provisional application No. 61/728,943, filed on Nov. 21, 2012.

(51) Int. Cl.
| | |
|---|---|
| G06F 15/16 | (2006.01) |
| G06F 11/32 | (2006.01) |
| H04L 29/06 | (2006.01) |
| H04L 12/26 | (2006.01) |
| G06F 15/173 | (2006.01) |

(52) U.S. Cl.
CPC .......... *G06F 11/325* (2013.01); *H04L 63/0236* (2013.01); *G06F 15/173* (2013.01); *H04L 43/0817* (2013.01)

(58) Field of Classification Search
CPC . G06F 11/325; G06F 15/173; H04L 43/0817; H04L 12/26; H04L 63/0236
See application file for complete search history.

(56) References Cited

U.S. PATENT DOCUMENTS

| | | | | |
|---|---|---|---|---|
| 6,826,631 B2* | 11/2004 | Webb | ............... | H04L 43/0817 340/641 |
| 7,312,719 B2* | 12/2007 | Hsieh | ............... | H04L 43/0817 340/644 |
| 7,342,891 B2* | 3/2008 | Chen | ............... | H04L 12/2602 370/241 |
| 7,533,194 B2* | 5/2009 | Koertel | ............... | G06F 13/4068 439/677 |
| 8,103,801 B1* | 1/2012 | Sardella | ............... | G06F 11/325 710/1 |
| 8,686,870 B2* | 4/2014 | Caveney | ............... | H04Q 1/138 340/687 |
| 8,705,572 B2* | 4/2014 | Pandit | ............... | G06F 13/28 370/474 |
| 9,008,112 B1* | 4/2015 | Lee | ............... | G06F 1/3215 315/291 |
| 2005/0269580 A1* | 12/2005 | D'Angelo | ............... | H05B 33/0818 257/88 |
| 2007/0090964 A1* | 4/2007 | You | ............... | G06F 11/325 340/815.45 |
| 2013/0054788 A1* | 2/2013 | Corddry | ............... | H04L 43/0817 709/224 |

FOREIGN PATENT DOCUMENTS

| | | | | |
|---|---|---|---|---|
| CN | 103181119 A | * | 10/2010 | ............... H04L 69/18 |
| CN | 103181119 A | * | 6/2013 | ............... H04L 12/4625 |

OTHER PUBLICATIONS

QLogic Corp, Converged Network Adapters QLogic 8200 Series, Jul. 13, 2011.*

*Primary Examiner* — Moustafa M Meky
*Assistant Examiner* — Thorne E Waugh
(74) *Attorney, Agent, or Firm* — Klein, O'Neill & Singh, LLP (57) ABSTRACT

A network device and associated methods are provided. The device includes a plurality of ports capable of communicating using a plurality of protocols; a light emitting diode (LED) circuit configured to display at least two different colors; and a processor configured to send a signal to the LED package to select between the two different colors. The selected color depends on the protocol used by a network device port to communicate with the other network device port.

21 Claims, 5 Drawing Sheets

| Ethernet Header 502 | FCOE Header 504 | SOF 506 | FC Header 508 | Pay Load 510 | FC CRC 512 | EOF 514 | Ethernet FCS 516 |

| Word/Bits | FC Header 508 |||||
|---|---|---|---|---|---|
| | 31        24 | 23        16 | 15        08 | 07        00 ||
| | R_CTL 508C | D_ID | | 508A ||
| | CS_CTL/Priority | S_ID | | 508B ||
| | Type | F_CTL ||||
| | SEQ_ID | DF_CTL | SEQ_CNT |||
| | OX_ID || RX_ID |||
| | Parameter |||||

FIG. 5C

SYSTEMS AND METHODS FOR IDENTIFYING PORT PROTOCOLS USING LEDS

CROSS-REFERENCE TO RELATED APPLICATIONS

This application claims priority under 35 U.S.C. §119(e) based on U.S. Provisional Patent Application Ser. No. 61/728,943, filed on Nov. 21, 2012, the disclosure of which is incorporated herein by reference in its entirety.

BACKGROUND

1. Technical Field

The embodiments disclosed herein are related to networks and network devices.

2. Related Art

Networking systems are commonly used to move network information (which may also be referred to interchangeably as frames, packets or commands) between computing systems (for example, servers) or between computing systems and network devices (for example, storage systems). Various hardware and software components are used to implement network communication.

A network device, for example, a switch, an adapter and others, is typically a multi-port device where each port manages a point-to-point connection between itself and an attached system. Each port can be attached to a server, peripheral, input/output subsystem, bridge, hub, router, or another switch, where each of the aforementioned network devices also has one or more ports. Different network and storage protocols may be used to handle network information and storage information. Continuous efforts are being made to enhance the use of networking and storage protocols.

SUMMARY

In one embodiment, a system using a light emitting diode (LED) for indicating a protocol used by a network device port to communicate with another network device port is provided. The system includes a processor for the network device configured to send a first signal to activate a LED package capable of displaying at least two different colors and a second signal to select between the two different colors; wherein the selected color depends on the protocol used by the network device port to communicate with the other network device port.

In another embodiment, a method is provided. The method includes sending a first signal to activate a light emitting diode (LED) package of a network device having a port that can be configured to operate using one or more protocols; wherein the LED package is capable of displaying at least two different colors; and providing a second signal from a network device processor to the LED package to display one of the two different colors such that the displayed color indicates a protocol used by the network device port to communicate with another port.

In yet another embodiment, a network device is provided. The device includes a plurality of ports capable of communicating using a plurality of protocols; a light emitting diode (LED) circuit configured to display at least two different colors; and a processor configured to send a signal to the LED package to select between the two different colors; wherein the selected color depends on the protocol used by a network device port to communicate with the other network device port A brief summary has been provided so that the nature of the embodiments may be understood quickly. A more complete understanding of the embodiments can be obtained by reference to the following detailed description of the embodiments thereof concerning the attached drawings

BRIEF DESCRIPTION OF THE DRAWINGS

The various present embodiments now will be discussed in detail with an emphasis on highlighting the advantageous features. These embodiments depict the novel and non-obvious systems and methods for packet grouping in networks shown in the accompanying drawings, which are for illustrative purposes only. These drawings include the following figures, in which like numerals indicate like parts:

FIG. 1 is a functional block diagram of a network that the present embodiments may be used in connection with;

DETAILED DESCRIPTION

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system" and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein, may be implemented as a computer process (method), a computing system, or as an article of manufacture, such as a computer program product or non-transitory, computer-readable media. The computer program product may be computer storage media, readable by a computer device, and encoding a computer program of instructions for executing a computer process.

Various network standards and protocols may be used to enable network communications, including Fibre Channel (FC), Fibre Channel over Ethernet (FCoE), Ethernet, and others. Below is a brief introduction to some of these standards. The present embodiments are described herein with reference to the Fibre Channel and Ethernet protocols. However, these protocols are used merely for ease of reference and to provide examples. The present embodiments are not limited to Fibre Channel and Ethernet.

Fibre Channel (FC) is a set of American National Standards Institute (ANSI) standards. Fibre Channel provides a serial transmission protocol for storage and network protocols such as HIPPI, SCSI, IP, ATM and others. Fibre Channel provides an input/output interface to meet the requirements of both Channel and network users. The Fibre Channel standards are incorporated herein by reference in their entirety.

Fibre Channel supports three different topologies: point-to-point, arbitrated loop and Fibre Channel Fabric. The point-to-point topology attaches two devices directly. The arbitrated loop topology attaches devices in a loop. The Fabric topology attaches computing systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes them to other ports. Fibre Channel switches use memory buffers to hold frames received and sent across a network. Associated with these buffers are credits, which are the number of frames that a buffer can hold per Fabric port.

Ethernet is a family of computer networking technologies for local area networks (LANs). Systems communicating over Ethernet divide a stream of data into individual packets called frames. Each frame contains source and destination addresses and error-checking data so that damaged data can be detected and re-transmitted. Ethernet is standardized in IEEE 802.3, which is incorporated herein by reference in its entirety.

Fibre Channel over Ethernet (FCoE) is a converged network and storage protocol for handling both network and storage traffic. The FCoE standard enables network adapters and network switches to handle both network and storage traffic using network and storage protocols. Under FCoE, Fibre Channel frames are encapsulated in Ethernet frames. Encapsulation allows Fibre Channel to use 100 Gigabit Ethernet networks (or higher speeds) while preserving the Fibre Channel protocol.

The systems and processes described below are applicable and useful in the upcoming cloud computing environment. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

Figure 1:
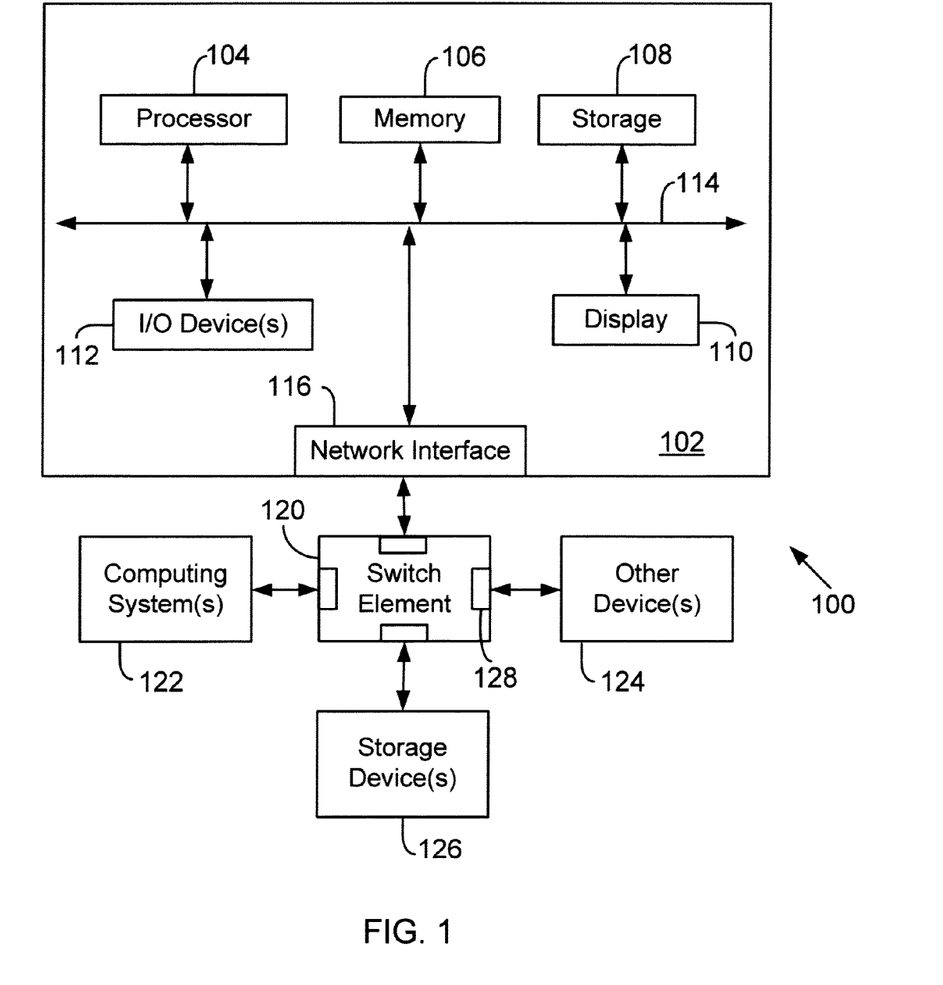

FIG. 1 shows an example of a system 100 that may be used in connection with the present embodiments. System 100 may include a computing system 102, which may be referred to as a host system. A typical host system 102 includes several functional components, including a central processing unit (CPU), also referred to as a processor, processors or processing module 104, a host memory (or main/system memory) 106, a storage device 108, a display 110, input/output ("I/O") device(s) 112, and other components (or devices). The host memory 106 is coupled to the processor 104 via a system bus or a local memory' bus 114. The processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware-based devices.

The host memory 106 provides the processor 104 access to data and program information that is stored in the host memory 106 at execution time. Typically, the host memory 106 includes random access memory (RAM) circuits, read-only memory (ROM), flash memory, or the like, or a combination of such devices.

The storage device 108 may comprise one or more internal and/or external mass storage devices, which may be or may include any conventional medium for storing large volumes of data in a non-volatile manner. For example, the storage device 108 may include conventional magnetic disks, optical disks such as CD-ROM or DVD-based storage, magneto-optical (MO) storage, flash-based storage devices, or any other type of non-volatile storage devices suitable for storing structured or unstructured data.

The host system 102 may also include a display device 110 capable of displaying output, such as an LCD or LED screen and others, and one or more input/output (I/O) devices 112, for example, a keyboard, mouse, etc. The host system 102 may also include other devices/interfaces for performing various functions, details of which are not germane to the inventive embodiments described herein.

The host system 102 also includes a network interface 116 for communicating with other computing systems 122, storage devices 126, and other devices 124 via a switch element 120 and various links. The network interface 116 may comprise a network interface card (NIC) or any other device for facilitating communication between the host system 102, other computing systems 122, storage devices 126, and other devices 124. The network interface 116 may include a converged network adapter, such as that provided by QLogic Corporation for processing information complying with storage and network protocols, for example, Fibre Channel and Ethernet. As an example, the network interface 116 may be a Fibre Channel over Ethernet (FCoE) adapter. In another embodiment, the network interface 116 may be a host bus adapter, for example, a Fibre Channel host bus adapter, such as that provided by QLogic Corporation. Details regarding the network interface 116 are not provided since they are not germane to the inventive embodiments described herein.

In one embodiment, the processor 104 of the host system 102 may execute various applications, for example, an e-mail server application, databases, and other application types. Data for various applications may be shared between the computing systems 122 and stored at the storage devices 126. Information may be sent via switch ports 120. The term port as used herein includes logic and circuitry for receiving, processing, and transmitting information.

Each device (e.g. the host system 102, the computing systems 122, the storage devices 126, and the other devices 124) may include one or more ports for receiving and transmitting information, for example, node ports (N_Ports), Fabric ports (F_Ports), and expansion ports (E_Ports). Node ports may be located in a node device, e.g. network interface 116 of the host system 102 and an interface (not shown) for the storage devices 126. Fabric ports are typically located in Fabric devices, such as the switch element 120. Details regarding the switch 120 are provided below.

Figure 2:
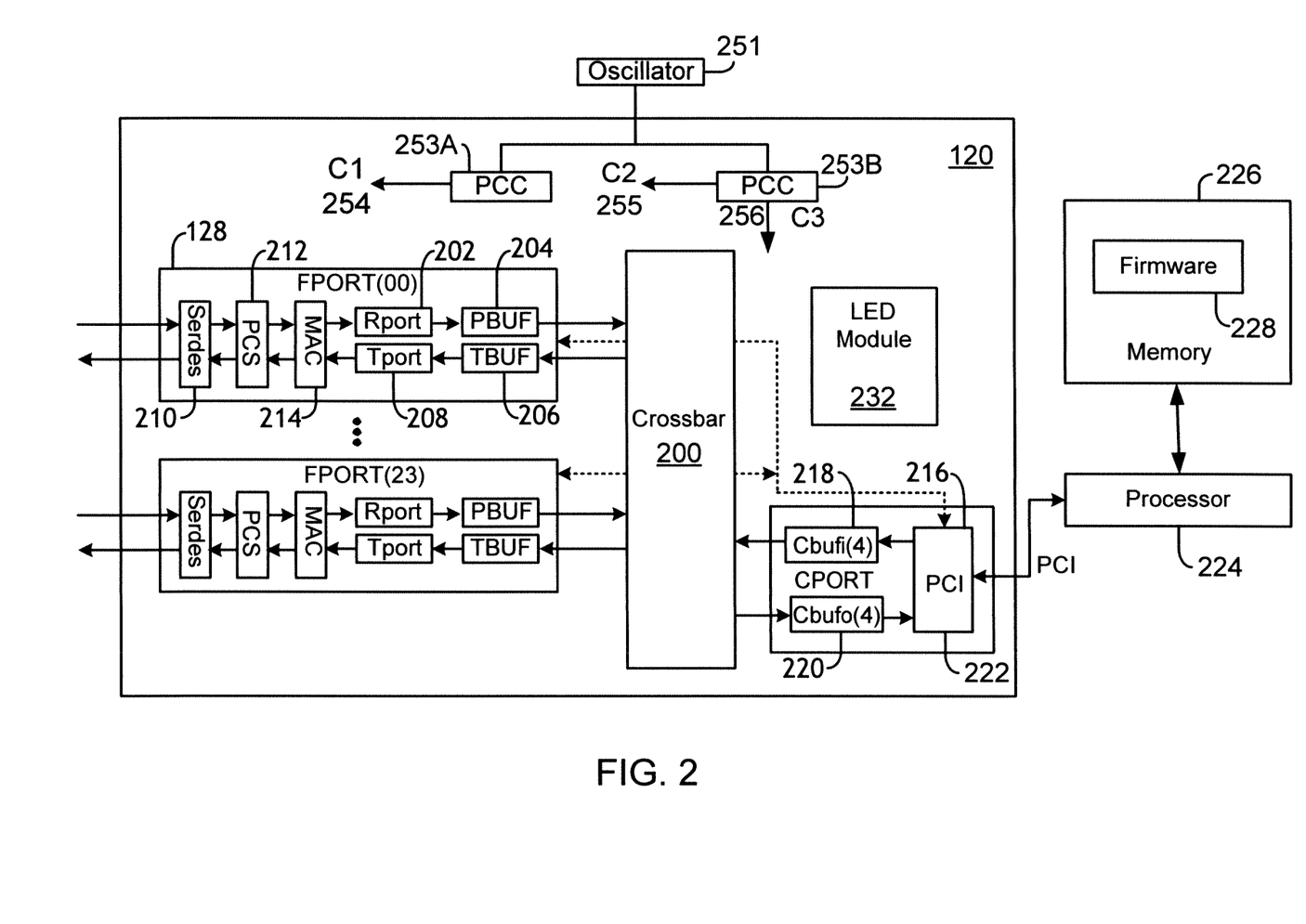
FIG. 2 is a functional block diagram of a switch element according to the present embodiments.

FIG. 2 is a high-level block diagram of switch element 120, also referred to as the switch 120. Switch element 120 may be implemented as an application specific integrated circuit (ASIC) having a plurality of ports 128. An external oscillator 251 may be used to power a plurality of phase locked loop (PLL) circuits 253A-253B to generate a plurality of clocks. C1 254, C2 255 and C3 256. As an example, C1 254 may be 425 MHz when a port is configured to operate as a Fibre Channel port, C2 255 may be 312 MHz when a port is configured to operate as an Ethernet port, and C3 256 may be a system clock of 825 MHz. The embodiments disclosed herein are not limited to any particular clock rate.

Ports 128 are generic (GL) ports and may include an N_Port, F_Port, FL_Port, E-Port, or any other port type. Ports 128 may be configured to operate as Fibre Channel. FCoE or Ethernet ports. In other words, depending upon what it is attached to, each GL port can function as any type of port. As an example, ports 128 of FIG. 2 are drawn on the same side of the switch element 120. However, the ports 128 may be located on any or all sides of switch element 120. This does not imply any difference in port or ASIC design. The actual physical layout of the ports will depend on the physical layout of the ASIC.

Ports 128 communicate via a time-shared crossbar 200, which includes a plurality of switch crossbars for handling specific types of data and data flow control information. For illustration purposes only, the switch crossbar 200 is shown as a single crossbar. The switch crossbar 200 may be a connectionless crossbar (packet switch) of conventional design, sized to connect a plurality of paths. This is to accommodate the ports 128 plus a port 216 for connection to a processor 224 that may be external to the switch element 120. In another embodiment, the processor 224 may be located within a switch chassis that houses the switch element 120.

Each port 128 receives incoming frames (or information) and processes the frames according to various protocol requirements. The port 128 includes a shared, time-multiplexed pipeline for receiving frames (or information). The pipeline includes a serializer/deserializer (SERDES) 210, a physical coding sub-layer (PCS) 212, and a time multiplexed media access control (MAC) sub-layer 214. The SERDES 210 receives incoming serial data and converts it to parallel data. The parallel data is then sent to the PCS 212 and the MAC 214 before being sent to a receive segment (or receive port (RPORT) 202).

The RPORT 202 temporarily stores received frames at a memory storage device, shown as PBUF (pause buffer) 204. The frames are then sent to a transmit segment, or transmit port (TPORT) 208 via the crossbar 200. The TPORT 208 includes a memory device shown as a transmit buffer (TBUF) 206. The TBUF 206 may be used to stage frames or information related to frames before being transmitted. The TPORT also includes a shared MAC and PCS, or shares the PCS and MAC of the RPORT 202. The SERDES at TPORT is used to convert parallel data into a serial data stream.

The switch element 120 may also include a control port (CPORT) 216 that communicates with the processor 224. The CPORT 216 may be used for controlling and programming the switch element 120. In one embodiment, the CPORT 216 may include a PCI (Peripheral Component Interconnect) 222 interface to enable the switch element 120 to communicate with the processor 224 and a memory 226. The processor 224 controls overall switch element operations, and the memory 226 may be used to store firmware instructions 228 for controlling switch element 120 operations.

The CPORT 216 includes an input buffer (CBUFI) 218, which is used to transmit frames from the processor 224 to the ports 128. The CPORT 216 further includes an output buffer (CBUFO) 220, which is used to vector frames from the PBUFs 204, the TBUFs 206, and CBUFI 218 that are destined to processor 224.

Port 128 described above may be referred to as a "base-port" that may have more than one network link available for receiving and transmitting information. Each network link allows the base-port to be configured into a plurality of independently operating sub-ports, each uniquely identified for receiving and sending frames. The configuration may vary based on protocol and transfer rates. For example, port 128 may be configured to operate as four single lane Ethernet ports, three single lane Ethernet ports and one single lane Fibre Channel port, two single lane Ethernet ports and two single lane Fibre Channel ports, one single lane Ethernet port and three single lane Fibre Channel ports, four single lane Fibre Channel ports, two double lane Ethernet ports, one double lane Ethernet port and two single lane Ethernet ports, one double lane Ethernet port, one single lane Ethernet port and one single lane Fibre Channel port, one double lane Ethernet port and two single lane Fibre Channel ports, one four lane Ethernet port or one four lane Fibre Channel port. Port 128 uses some logic that is shared among the multiple sub-ports and some logic that is dedicated to each sub-port.

In one embodiment, light emitting diode (LED) module 232 is provided for protocol identification for a network switch port that supports more than one protocol. With new converged network switch products, ports may operate in either Fibre Channel (FC) or Fibre Channel over Ethernet (FCOE) protocol mode. Protocol identification becomes important to facilitate cable or transceiver installation, since connections between ports may not be protocol-compatible. LED module 232 provides a system and a method for identifying ports using a particular protocol, which aids in ongoing network planning and cable management as users typically prefer to group similar protocol connections together on a network device.

Current multi-protocol products use a management application executed by a management console to determine protocol settings for each port. This can result in misconfigured networks, particularly if the management console is not located in close proximity to the network device, or if the network device has a high port density, which can be confusing for the user.

In one embodiment, a circuit to use multi- (for example, dual-) color LED indicators are used to convey protocol settings visually. This capability may be combined with existing LED functions on the switch to maximize use of limited faceplate space.

Traditionally, each port of a network switch has an LED display to indicate login or data activity. The LEDs for all ports are typically green. However, by using multiple distinct colors with each color representing a unique protocol, each port can display protocol information without any additional indicators or querying mechanism.

Figure 3A:
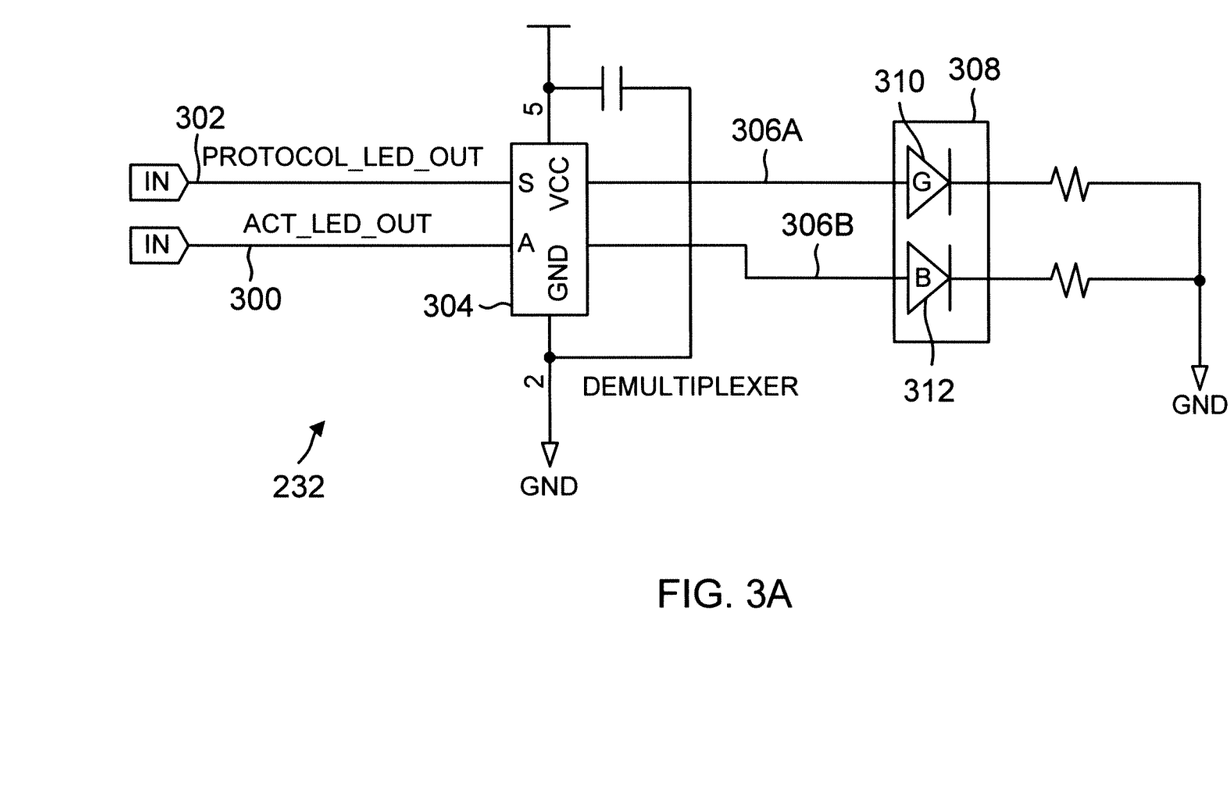
FIG. 3A shows a circuit, according to one embodiment.

FIG. 3A shows a schematic LED module 232 that can be used for identifying a protocol used by a network device port, according to one embodiment. The network device port may be in a switch, adapter or any other network device. The embodiments described herein are based on a network switch element but the adapter embodiments may be used for an adapter, network interface card or other network device types.

LED module 232 receives a first signal (ACT_LED_OUT) 300 from a network device processor (for example, 224, FIG. 2). The first signal 300 is sent to a multiplexer device 304 and is used to activate a LED package 308 (via 306A) that is capable of emitting at least two different colors, for example, green and blue. The green color is emitted by LED 310 (shown as "G") and the blue color is emitted by LED 312 (shown as "B"). LED package 308 is a bicolor LED package with the blue and green elements collocated within the body of the LED package.

Processor 224 also sends a second signal 302 shown as Protocol_LED_Out. The second signal 302 is used to select between the blue LED 312 or the green LED 310 based on the protocol type, for example, FCOE or FC. The second signal 302 is also sent via multiplexer 304 and is shown as 306B. The light emitted from the LED then illuminates front panel triangles, shown as an example in FIG. 4, and described below.

Figure 3B:
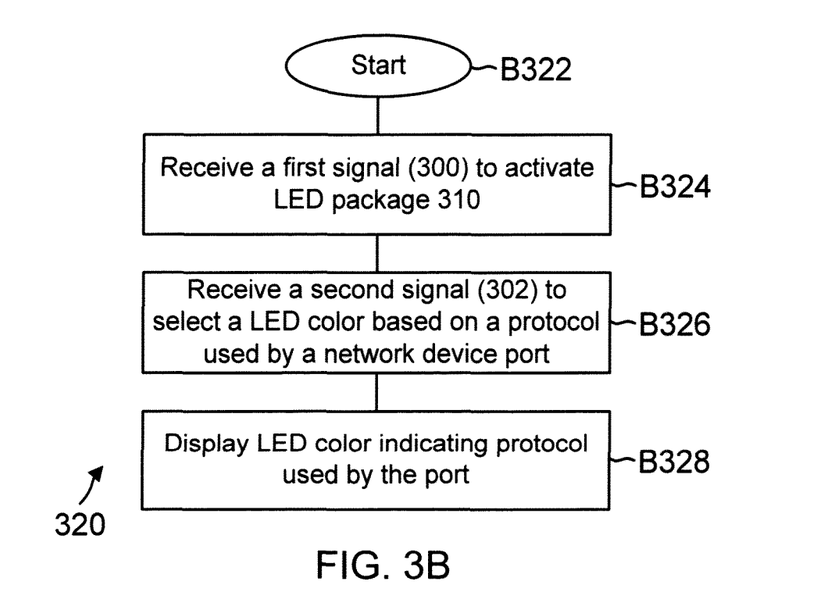
FIG. 3B shows a process according to one embodiment.

FIG. 3B shows a process 320, according to one embodiment. The process begin in block 322 when a network device, for example, 120 is initialized and is getting ready for operation. In another example, network device may be reset.

In block B324, a first signal (300) is sent to activate the LED package 308. The first signal may be sent by a processor (for example, 224). In block B326, a second signal is received to select one of the plurality of LEDs in the LED package 308. The LED is selected based on the protocol used by the network device port.

Figure 4:
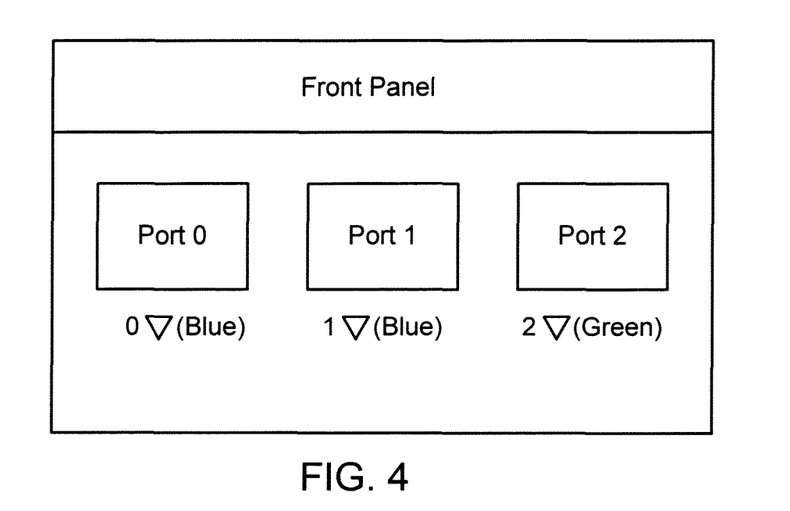
FIG. 4 shows an example of using the circuit of FIG. 3A.

In block B328, a color, based on the selected LED (block B326) is displayed. The color indicates the protocol that is used by the network device port to communicate with another port. As an example, the color may be displayed at a front panel of the network device (or switch 120), for example, as a blue or green triangle, as shown in FIG. 4. As described above, switch 120 has ports, which can operate in either FC or FCOE mode. The triangle figures on the front panel may be blue and green triangles powered with light from LEDs 310 and 312. The triangles illuminated in blue may indicate FCOE, while the triangles illuminated in green may be used to indicate FC. For each port there is a corresponding display. As shown, Port 0 corresponds to triangle 0, Port 1 corresponds to triangle 1, Port 2 corresponds to triangle 2.

The present embodiments improve protocol mode identification by using at least two different LED colors to automatically indicate protocol mode/type. As an example, port login/activity remains unchanged as on a typical single protocol switch. However with a multiplexer and at least one bi-color LED circuit one can select between two colors based on a protocol type.

Figure 5A:
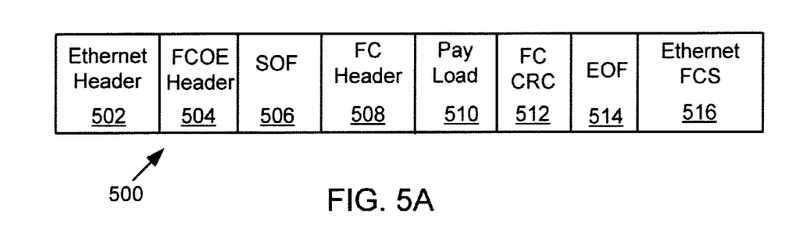
FIGS. 5A-5C illustrate examples of frame formats used by the current embodiments.

FIG. 5A shows an example of an FCoE packet format 500 for processing network and storage traffic, according to the present embodiments. The FCoE packet 500 includes an Ethernet header 502. In one embodiment, the Ethernet header 502, which includes the Ethernet type, may be fourteen bytes in length, for example. The Ethernet header may also include optional Tag fields (not shown). The FCoE packet 500 also includes an FCoE header 504 that includes a number of reserved fields. A start of frame (SOF) 506 indicates the beginning of the embedded Fibre Channel frame and may be one byte, for example.

The FCoE packet 500 may also include a Fibre Channel header (FC Header) 508 that may be 24 bytes long with a payload 510. The Fibre Channel cyclic redundancy code (CRC) 512 may be 4 bytes and the Fibre Channel end of frame (EOF) 514 may be 1 byte in size. The EOF 514 indicates the end of the embedded Fibre Channel frame. The Ethernet FCS 516 is inserted after the Fibre Channel EOF 514.

Figure 5B:
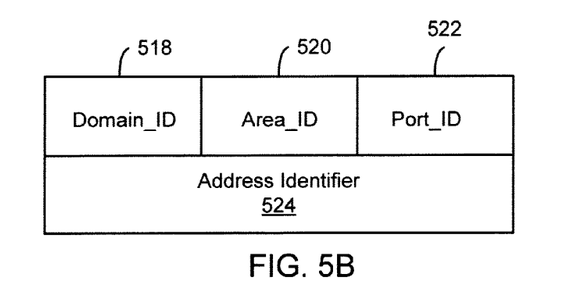

FIG. 5B shows a standard 24-bit Fibre Channel address identifier 524. The address identifier 524 includes a Domain_ID 518, an Area_ID 520, and a Port_ID 522. The Domain_ID 518 is a Domain identifier based on the upper 8-bits of the 24-bit Fibre Channel address. A Domain includes one or more Fibre Channel switches that has the same Domain_ID for all N_Ports and NL_Ports within or attached to the switches. If there is more than one switch in the Domain, then each switch within the Domain is directly connected via an Inter-Switch Link to at least one other switch in the same Domain.

The Area_ID 520 is an Area identifier based on the middle 8 bits of the 24-bit Fibre Channel address. The Area_ID 520 applies either to (a) one or more N_Ports within and attached to a Fibre Channel switch, or (b) to an Arbitrated Loop of NL_Ports attached to a single FL_Port.

The Port_ID 522 is the lower 8-bits of a Fibre Channel address. The Port_ID 522 applies to either (a) a single N_Port or virtualized N_Port within a Domain/Area, (b) the valid AL_PA of a single NL_Port or FL_Port on an Arbitrated Loop.

Figure 5C:
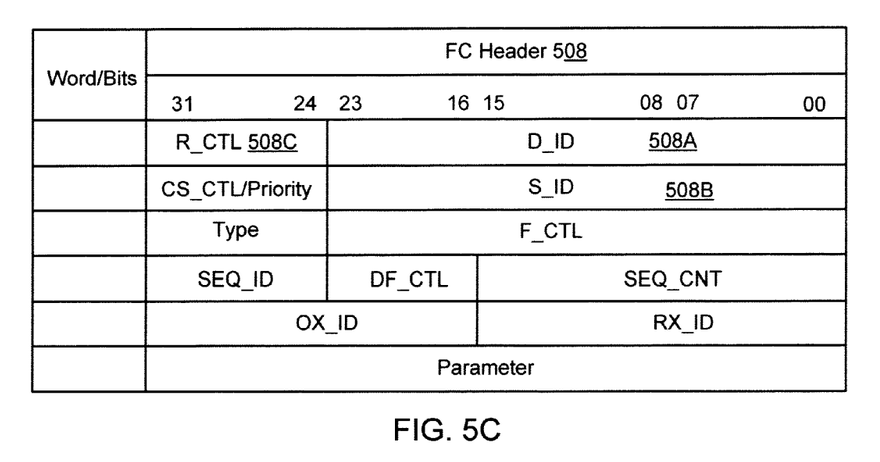

FIG. 5C shows an example of the FC header 508 of FIG. 5A. The following frame header fields that are used in the present methods are:

D_ID 508A—A 24-bit Fibre Channel frame header field that contains the destination address for a frame; and S_ID 508B—A 24-bit Fibre Channel frame header field that contains the source address for a frame.

R_CTL 508C—A routing control flag in a Fibre Channel header.

The above description presents the best mode contemplated for carrying out the present disclosure, and of the manner and process of making and using it, in such full, clear, concise, and exact terms as to enable any person skilled in the art to which it pertains to make and use this disclosure. This disclosure is, however, susceptible to modifications and alternate constructions from that discussed above that are fully equivalent. For example, the network device using the LED module 232 may be an adapter, a network interface card, a converged adapter or any other device type. Consequently, this disclosure is not limited to the particular embodiments disclosed. On the contrary, this disclosure covers all modifications and alternate constructions coming within the spirit and scope of the disclosure.

What is claimed is:

1. A system for indicating a protocol used by a network device port to communicate with another network device port, comprising:

a light emitting diode (LED) package configured to display at least two different colors, where a first color indicates a first protocol used by the network device port to communicate with the other network device port and a second color indicates a second protocol used by the network device port to communicate with the other network device port; and a processor for the network device configured to send a first signal to activate the LED package and a second signal to select between the at least two different colors; wherein a selected color from the first color and the second color depends on the first protocol and the second protocol used by the network device port to communicate with the other network device port.

2. The system of claim 1, wherein the network device port uses Ethernet for network communication using an Ethernet link.

3. The system of claim 1, wherein the network device port uses Fibre Channel protocol for communication.

4. The system of claim 1, wherein the network device port uses Fibre Channel over Ethernet protocol for communication involving network and storage traffic.

5. The system of claim 1, wherein the network device is a switch element in a network.

6. The system of claim 1, wherein the network device is an adapter coupled to a computing system.

7. The system of claim 1, wherein the network device is a converged adapter that can support both a network protocol and a storage protocol.

8. A method, comprising:
sending a first signal to activate a light emitting diode (LED) package of a network device having a port that can be configured to operate using one or more protocols; wherein the LED package is configured to display at least two different colors, where a first color indicates a first protocol used by the network device port to communicate with another port and a second color indicates a second protocol used by the network device port to communicate with the other port; and
providing a second signal from a network device processor to the LED package to display one of the at least two different colors such that the displayed color indicates a protocol from among the first protocol and the second protocol used by the network device port to communicate with another port.

9. The method of claim 8, wherein the network device port uses Ethernet for network communication using an Ethernet link.

10. The method of claim 8, wherein the network device port uses Fibre Channel protocol for communication.

11. The method of claim 8, wherein the network device port uses Fibre Channel over Ethernet protocol for communication involving network and storage traffic.

12. The method of claim 8, wherein the network device is a switch element in a network.

13. The method of claim 8, wherein the network device is an adapter coupled to a computing system.

14. The method of claim 8, wherein the network device is a converged adapter that can support both a network protocol and a storage protocol.

15. A network device, comprising:
a plurality of ports for communicating using a plurality of protocols;
a light emitting diode (LED) circuit configured to display at least two different colors, where a first color indicates a first protocol from among the plurality of protocols used by the network device port to communicate with another network device port and a second color indicates a second protocol from among the plurality of protocols used by the network device port to communicate with the other network device port; and
a processor configured to send a signal to the LED package to select between the at least two different colors; wherein a selected color from among the first color and the second color depends on the first protocol and the second protocol used by a network device port to communicate with the other network device port.

16. The network device of claim 15, wherein the network device port uses Ethernet for network communication using an Ethernet link.

17. The network device of claim 15, wherein the network device port uses Fibre Channel protocol for communication.

18. The network device of claim 15, wherein the network device port uses Fibre Channel over Ethernet protocol for communication involving network and storage traffic.

19. The network device of claim 15, wherein the network device is a switch element in a network.

20. The network device of claim 15, wherein the network device is an adapter coupled to a computing system.

21. The network device of claim 15, wherein the network device is a converged adapter that can support both a network protocol and a storage protocol.

* * * * *